United States Patent
Nagata et al.

(10) Patent No.: US 6,782,691 B2
(45) Date of Patent: Aug. 31, 2004

(54) GAS TURBINE PLANT WITH HIGH DETECTION SENSITIVITY OF EXTRAORDINARY STATE

(75) Inventors: Shouichi Nagata, Hyogo-ken (JP); Hiroya Komiyama, Kanagawa-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/118,130

(22) Filed: Apr. 9, 2002

(65) Prior Publication Data

US 2002/0149485 A1 Oct. 17, 2002

(30) Foreign Application Priority Data

Apr. 17, 2001 (JP) ........................................ 2001-118626

(51) Int. Cl.[7] .............................................. F02C 7/00
(52) U.S. Cl. ..................................... 60/39.091; 60/803
(58) Field of Search ..................... 60/779, 803, 39.091, 60/39.281

(56) References Cited

U.S. PATENT DOCUMENTS 5,461,855 A * 10/1995 Inoue et al. .................. 60/776
6,460,346 B1 * 10/2002 Cleary .......................... 60/779

FOREIGN PATENT DOCUMENTS

| JP | 1-167418 | * 7/1989 |
|---|---|---|
| JP | 2000-18050 | 1/2000 |

* cited by examiner

*Primary Examiner*—Louis J. Casaregola
(74) *Attorney, Agent, or Firm*—Oblon, Spivak, McClelland, Maier & Neustadt, P.C.

(57) ABSTRACT

A gas turbine plant includes a combustion section, a turbine section, an exhaust section, a temperature detecting unit, and a monitoring unit. The combustion section combusts fuel using air to generate combustion gas. The turbine section is driven with the combustion gas from the combustion section. The exhaust section is connected to the turbine section to exhaust the combustion gas from the turbine section. The temperature detecting unit is provided in the exhaust section to measure a temperature of the combustion gas. The monitoring unit generates a warning signal based on a tolerable level and data corresponding to a temporal change of the temperature measured by the temperature detecting unit to indicate an extraordinary state of the gas turbine plant.

2 Claims, 7 Drawing Sheets

GAS TURBINE PLANT WITH HIGH DETECTION SENSITIVITY OF EXTRAORDINARY STATE

BACKGROUND OF THE INVENTION

1. Field of the Invention

The present invention relates to a gas turbine plant. Especially, the present invention relates to a gas turbine plant with a monitoring unit to monitor temperature in a turbine outlet and to detect an extraordinary state of the gas turbine plant.

2. Description of the Related Art

FIG. 1 shows an example of a conventional gas turbine plant. The gas turbine plant shown in FIG. 7 is comprised of a compressor 101, a gas turbine section 102, a combustion section 103 and a power generator 104. External air is taken in by the compressor 101, and is compressed, and supplied to the combustion section as compression air 105. Fuel 106 is supplied to the combustion section 103. The combustion section 103 combusts the fuel 106 using the compression air 105 to form the combustion air 110. The combustion air 110 is discharged from an exhaust section 112 as exhaust gas 111 after driving the turbine section 102.

N temperature detectors (N is a positive integer) 113 are provided in the exhaust section 112 in the neighborhood of an outlet of the gas turbine section 102. The N temperature detectors 113 are on N positions of the circumference of the exhaust section 112 in a constant interval. The N temperature detectors 113 monitor and measure the temperatures $T_1$ to $T_n$ on N positions in the neighborhood of the turbine outlet of the gas turbine section 102, i.e., blade path temperatures. The measured temperatures $T_1$ to $T_n$ are supplied to a monitoring unit 115. The monitoring unit 115 compares each of the temperatures $T_1$ to $T_n$ and a predetermined target value. The monitoring unit 115 detects an extraordinary state of the gas turbine plant when the difference of each of the temperatures $T_1$ to $T_n$ and a predetermined target value is equal to or larger than a tolerable level and emits a warning signal.

However, the temperatures $T_1$ to $T_n$ in the neighborhood of the turbine outlet change even when the gas turbine plant is operating normally. When the output of the gas turbine plant changes, swirler phenomenon is caused. As a result, the combustion gas 110 outputted from the combustion section 103 passes through the turbine section 102 in a twisted state. When the combustion gas 110 is twisted, the blade path temperatures $T_1$ to $T_n$ change. Such changes of the blade path temperatures $T_1$ to $T_n$ are not caused due to the extraordinary state of the combustion section 103.

Therefore, it is not possible to improve a detection sensitivity of the extraordinary state of the combustion section 103 by decreasing the tolerable level of the difference between each of the temperatures $T_1$ to $T_n$ and the predetermined target value, if the changes of the blade path temperatures $T_1$ to $T_n$ are considered.

In conjunction with the above description, a steam monitoring system in a steam cooled type gas turbine is disclosed in Japanese Laid Open Patent Application (JP-P2000-18050A). In this reference, cooling steam is supplied to a cooling object such as a combusting unit and winds. A temperature detector detects an exit temperature of the cooling steam after the cooling. A control apparatus inputs a detection signal from the temperature detector, and compares the detection signal with a predetermined signal. Also, the control apparatus generates a warning signal, a signal for adjusting an opening degree of a fuel flow rate adjusting valve or closing a closing valve, when the detection signal exceeds a predetermined signal.

SUMMARY OF THE INVENTION

Therefore, an object of the present invention is to provide a gas turbine plant which monitors blade path temperatures to detect an extraordinary state of a combustion section more correctly.

Another object of the present invention is to provide a gas turbine plant which has a high detection sensitivity of an extraordinary state of a combustion section, even if the changes of the blade path temperatures are caused.

In an aspect of the present invention, a gas turbine plant includes a combustion section, a turbine section, an exhaust section, a temperature detecting unit, and a monitoring unit. The combustion section combusts fuel using air to generate combustion gas. The turbine section is driven with the combustion gas from the combustion section. The exhaust section is connected to the turbine section to exhaust the combustion gas from the turbine section. The temperature detecting unit is provided in the exhaust section to measure a temperature of the combustion gas. The monitoring unit generates a warning signal based on a tolerable level and data corresponding to a temporal change of the temperature measured by the temperature detecting unit to indicate an extraordinary state of the gas turbine plant.

The monitoring unit may include a temperature change determining section which compares the tolerable level and the data corresponding to the temporal change of the measured temperature and generates the warning signal based on the comparison result. In this case, the temperature change determining section may include a delay unit and a difference calculating unit. The delay unit delays the measured temperature by a predetermined time period to produce a delayed temperature. The difference calculating unit calculates a difference between the delayed temperature and the measured temperature and outputs the calculated difference as the data corresponding to the temporal change of the measured temperature.

Also, when the gas turbine plant include a plurality of the temperature detecting units, the monitoring unit may include an averaging circuit and a plurality of temperature change determining sections. The averaging circuit calculates an average temperature of a plurality of the temperatures measured by the plurality of temperature detecting units. Each of the plurality of temperature change determining sections compares the tolerable level and the data corresponding to the temporal change of a temperature difference between the average temperature and a corresponding one of the plurality of measured temperatures and generates the warning signal based on the comparison result. In this case, the temperature change determining section may include a first difference calculating unit, a delay unit and a second difference calculating unit. The first difference calculating unit calculates the temperature difference between the average temperature and the corresponding measured temperature. The delay unit delays the temperature difference by a predetermined time period to produce a delayed temperature difference. The second difference calculating unit calculates a difference between the delayed temperature difference and the temperature difference and outputs the calculated difference as the data corresponding to the temporal change of the temperature difference.

Also, the tolerable level may be determined based on data varying in correspondence to an output of the gas turbine plant. In this case, when the gas turbine plant may include a plurality of the temperature detecting units, the monitoring unit may include an averaging circuit which calculates an average temperature of a plurality of the temperatures measured by the plurality of temperature detecting units, and the data varying in correspondence to an output of the gas turbine plant is the average temperature. Instead, the data varying in correspondence to an output of the gas turbine plant may be a quantity of the fuel supplied to the combustion unit. Otherwise, when the gas turbine plant may include a fuel control valve, the data varying in correspondence to an output of the gas turbine plant may be an opening degree of the fuel control valve.

Also, the monitoring unit further may include a determining unit which compares the measured temperature and a predetermined threshold level and generates another warning signal based on the comparison result.

Also, when the gas turbine plant includes a plurality of the temperature detecting units, the monitoring unit further may include an averaging circuit which calculates an average temperature of a plurality of the temperatures measured by the plurality of temperature detecting units; and a plurality of determining units, each of which compares a corresponding one of the measured temperatures and the average temperature and generates another warning signal based on the comparison result.

In another aspect of the present invention, a method of operating a gas turbine plant is achieved by (a) combusting fuel using air to generate combustion gas; by (b) driving a turbine with the combustion gas; by (c) exhausting the combustion gas from the turbine; by (d) measuring a temperature of the combustion gas; and by (e) generating a warning signal based on a tolerable level and data corresponding to a temporal change of the temperature measured by the temperature detecting unit to indicate an extraordinary state of the gas turbine plant.

In this case, the (e) generating step may be achieved by (f) comparing the tolerable level and the data corresponding to the temporal change of the measured temperature to generate the warning signal based on the comparison result. In this case, the (f) comparing steps may include delaying the measured temperature by a predetermined time period to produce a delayed temperature; and calculating a difference between the delayed temperature and the measured temperature to output the calculated difference as the data corresponding to the temporal change of the measured temperature.

Also, the (d) measuring step may be achieved by measuring a plurality of the temperatures of the combustion gas at a plurality of positions, and the (e) generating step may be achieved by calculating an average temperature of a plurality of the measured temperatures; and by (g) comparing the tolerable level and the data corresponding to the temporal change of a temperature difference between the average temperature and a corresponding one of the plurality of measured temperatures to generate the warning signals based on the comparison result. In this case, the (g) comparing step may include calculating the temperature difference between the average temperature and the corresponding measured temperature; delaying the temperature difference by a predetermined time period to produce a delayed temperature difference; and calculating a difference between the delayed temperature difference and the temperature difference to output the calculated difference as the data corresponding to the temporal change of the temperature difference.

Also, the tolerable level may be determined variably based on data corresponding to an output of the gas turbine plant.

DESCRIPTION OF THE PREFERRED EMBODIMENTS

Hereinafter, a gas turbine plant according to the present invention will be described with reference to the attached drawings.

Figure 1:
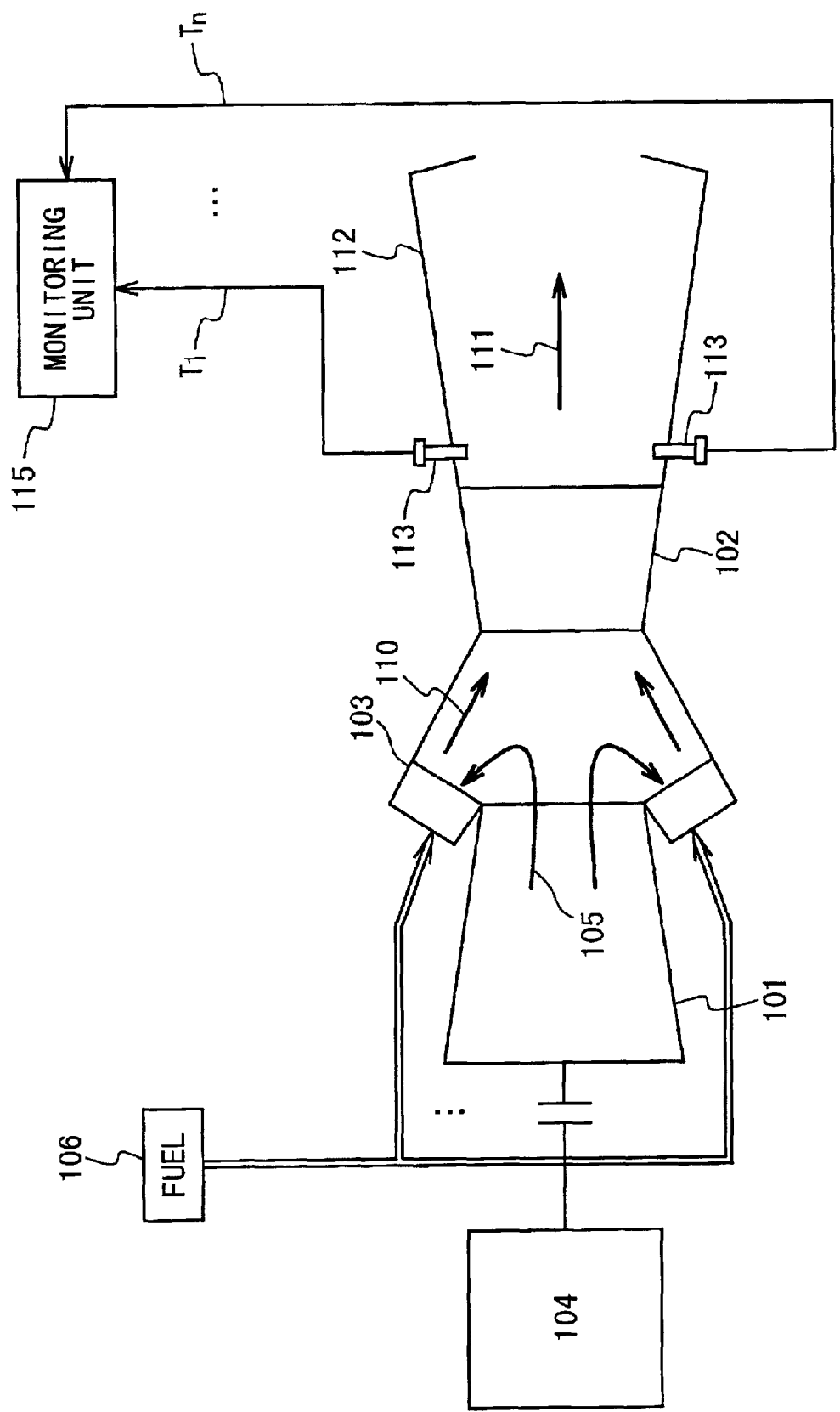
FIG. 1 is a diagram showing the structure of a conventional gas turbine plant.
Figure 2:
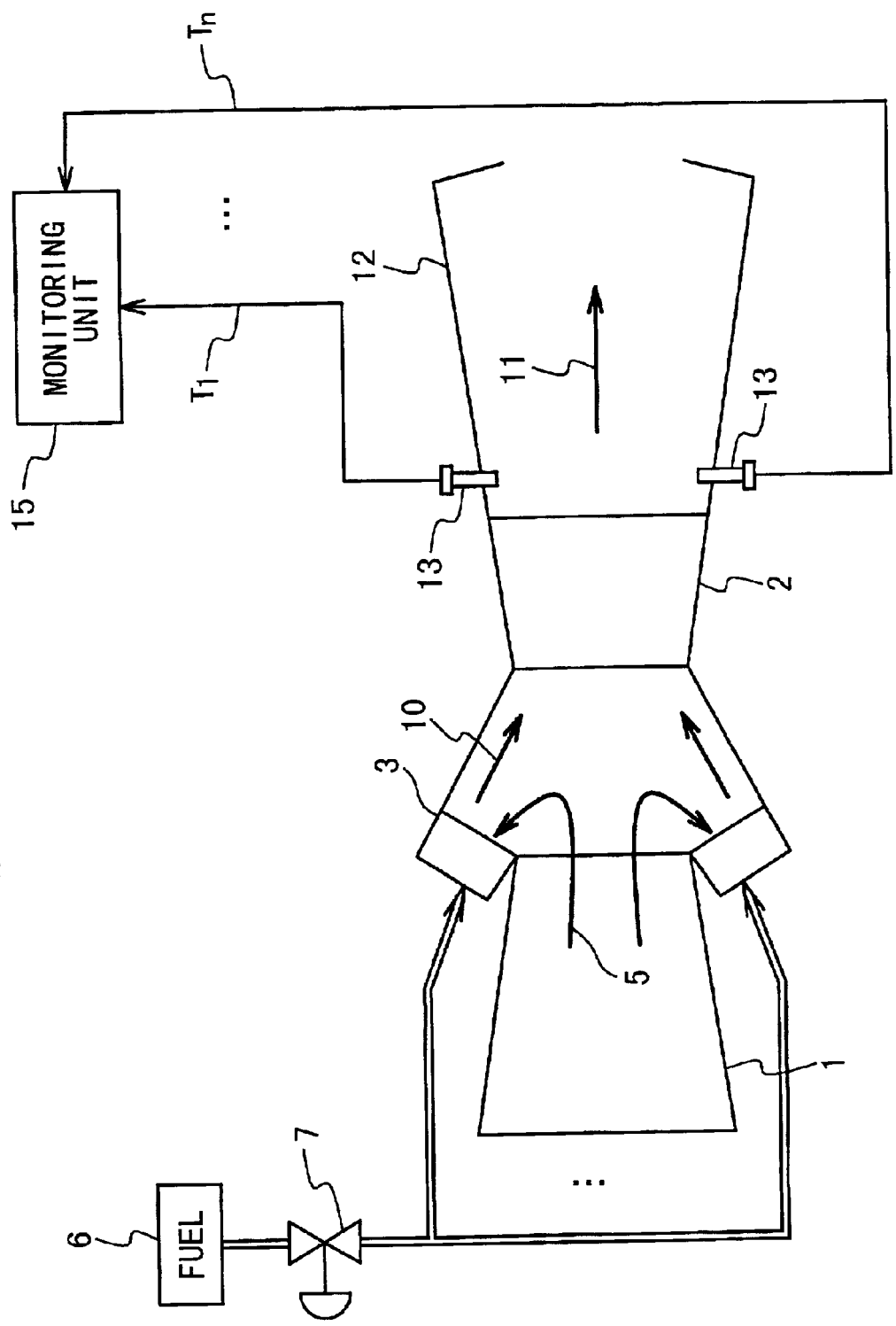
FIG. 2 is a diagram showing the structure of a gas turbine plant according to a first embodiment of the present invention.

FIG. 2 is a block diagram showing the structure of the gas turbine plant according to the first embodiment of the present invention. Referring to FIG. 2, the gas turbine plant in the first embodiment is comprised of a compressor 1, a turbine section 2, a combustion section 3, an exhaust section 12, and a monitoring unit 15.

The compressor 1 takes in external air, compresses and supplies the compressed air to the combustion section 3 as compression air 5. Fuel 6 is supplied to the combustion section 3 through a fuel supply valve 7. The combustion section 3 combusts the fuel 6 using the compression air 5 to form combustion air 10. The combustion air 10 is discharged from the exhaust section 12 as exhaust gas 11 after driving the turbine section 2.

The N (N is a positive temperature) temperature detectors 13 are provided in the exhaust section 12 in the neighborhood of the turbine outlet of the turbine section 2. The N temperature detectors 13 are provided on N positions of a circumference of the exhaust section in a constant interval. However, only two of the temperature detectors 13 are illustrated in FIG. 2. The N temperature detectors 13 monitor and measure the temperatures of the combustion gas on the N positions in the neighborhood of the turbine outlet. The measured temperatures are referred to as blade path temperatures $T_1$ to $T_n$. The temperature detectors 13 output the blade path temperatures $T_1$ to $T_n$ to the monitoring unit 15. The monitoring unit 15 detects an extraordinary state of the gas turbine plant from the blade path temperatures $T_1$ to $T_n$ and outputs warning signals.

Figure 3:
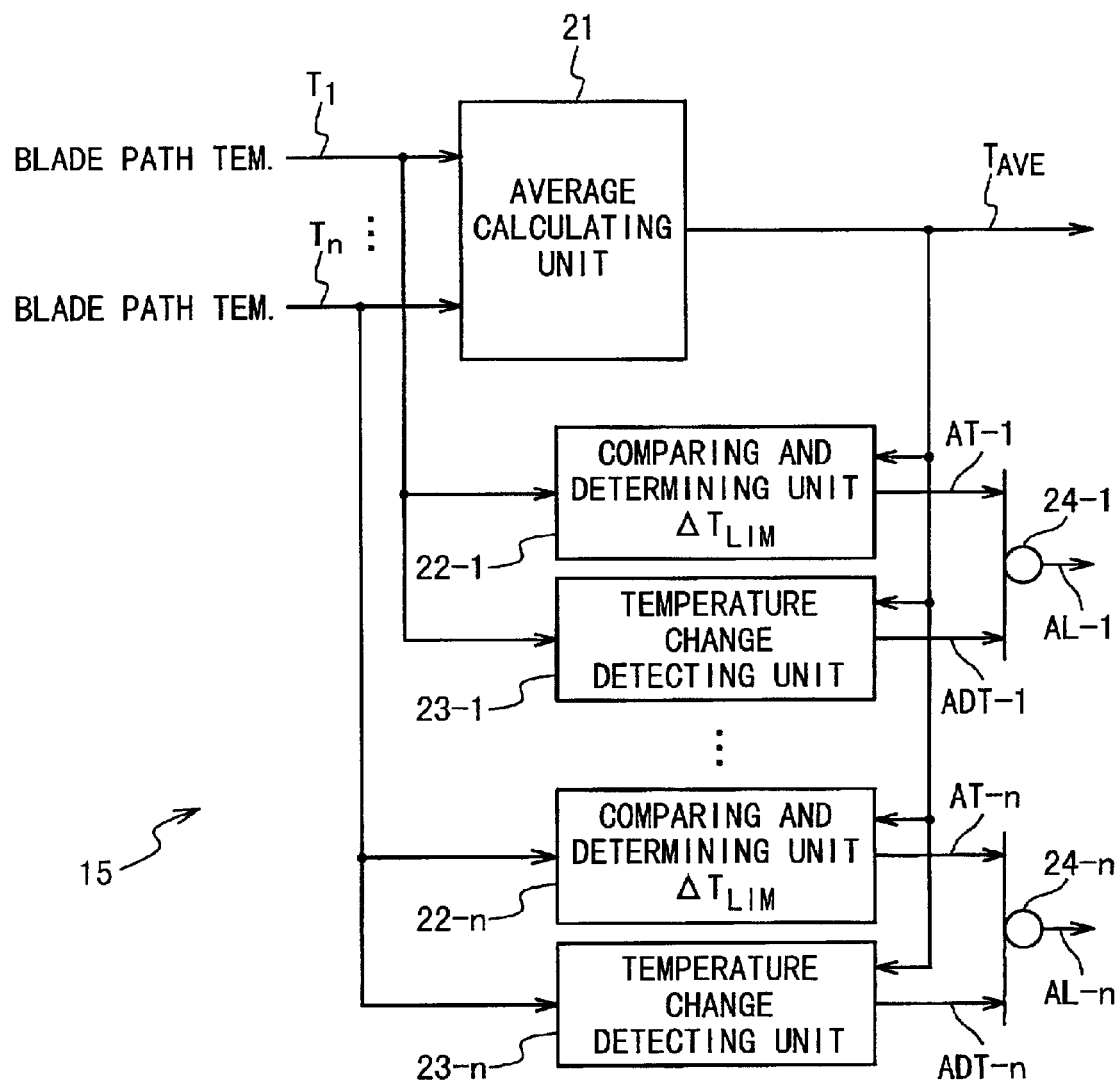
FIG. 3 is a diagram showing the structure of a monitoring unit used in the gas turbine plant in the first embodiment.

FIG. 3 shows the structure of the monitoring unit 15. The monitoring unit 15 contains an average calculating unit 21, comparing and determining unit 22-1 to 22-n, temperature change determining units 23-1 to 23-n and OR gates 24-1 to 24-n.

The average calculating unit 21 calculates an average temperature $T_{AVE}$ of the blade path temperatures $T_1$ to $T_n$. The comparing and determining unit 22-1 outputs a warning signal AT-1 when the difference $\Delta T_1$ of the average temperature $T_{AVE}$ and the blade path temperature T1 is equal to or larger than a predetermined temperature difference $\Delta T_{LIM}$. On the other hand, the comparing and determining unit 22-1 does not output the warning signal AT-1 when the difference $\Delta T_1$ is smaller than the temperature difference $\Delta T_{LIM}$. The comparing and determining units 22-2 to 22-n operate in the same way as the comparing and determining unit 22-1 except that the blade path temperatures inputted thereto are different. That is, the comparing and determining unit 22-i (i is an integer satisfying a relation of $1 \leq i \leq n$) of the comparing and determining unit 22-1 to 22-n outputs the warning signal AT-i, when the difference $\Delta T_i$ of the average temperature $T_{AVE}$ and the blade path temperature $T_i$ is equal to or larger than the predetermined temperature difference $\Delta T_{LIM}$. Also, the comparing and determining unit 22-i does not output the warning signal AT-i when the difference $\Delta T_i$ is smaller than the temperature difference $\Delta T_{LIM}$.

The temperature change determining unit 23-1 determines whether the temporal change of the difference $\Delta T_1$ of the average temperature $T_{AVE}$ and the blade path temperature $T_1$ is equal to or larger than a threshold value. When determining that the temporal change of the difference $\Delta T_i$ is equal to or larger than the threshold value, the temperature change determining unit 23-1 outputs the warning signal ADT-1. When determining that the temporal change of the difference $\Delta T_1$ is smaller than the threshold value, the temperature change determining unit 23-1 does not output the warning signal ADT-1. The temperature change determining units 23-2 to 23-n operate in the same way as the temperature change determining unit 23-1 except that the blade path temperatures inputted thereto are different. That is, the temperature change determining unit 23-i (i is an integer satisfying a relation of $1 \leq i \leq n$) of the temperature change determining units 23-1 to 23-n determines whether the temporal change of the difference $\Delta T_i$ of the average temperature $T_{AVE}$ and the blade path temperature $T_i$ is equal to or larger than a corresponding threshold value. When determining that the temporal change of the difference $\Delta T_i$ is equal to or larger than the corresponding threshold value, the temperature change determining unit 23-i outputs the warning signal ADT-i. When determining that the temporal change of the difference $\Delta T_i$ is smaller than the corresponding threshold value, the temperature change determining unit 23-i does not output the warning signal ADT-i.

The reason why the difference $\Delta T_i$ of the average temperature $T_{AVE}$ and the blade path temperature $T_i$ is used for the determination of the extraordinary state is as follows. The blade path temperature $T_i$ changes in accordance with the operation of the gas turbine plant. Therefore, a reference value used to determine whether or not the gas turbine plant is in an extraordinary state needs to be determined in accordance with the operation situation of the gas turbine plant. In the first embodiment, the average temperature $T_{AVE}$ of the blade path temperatures $T_1$ to $T_n$ is used as the reference value to determine the extraordinary state of the gas turbine plant. It is possible to determine that the blade path temperature $T_i$ is extraordinary when the difference $\Delta T_i$ of the average temperature $T_{AVE}$ and the blade path temperature $T_i$ is equal to or larger than a predetermined value. By using the average temperature $T_{AVE}$ as the reference value to determine the extraordinary state of the gas turbine plant, it becomes unnecessary to determine the reference value to the blade path temperature $T_i$ in accordance with the operation situation of the gas turbine plant.

Moreover, a tolerable level R to the temporal change of the temperature difference $\Delta T_i$ is changed in accordance with the temporal change of the output P of the gas turbine plant. The reason is as follows. When the output P of the gas turbine plant changes, swirler phenomenon occurs. As a result, the combustion gas 10 outputted from the combustion section 3 passes through the turbine section 2 in a twisted state. When the combustion gas 10 is twisted, the blade path temperatures $T_1$ to $T_n$ change. That is, the changes of the blade path temperatures $T_1$ to $T_n$ caused in accordance with the change of the output P of the gas turbine plant is not an indication of the extraordinary state of combustion section 3. Therefore, when the output P of the gas turbine plant is changing, the tolerable level R to the temporal change of the temperature difference $\Delta T_i$ is made larger. On the other hand, when the output P of the gas turbine plant is not changing, the tolerable level R to the temporal change of the temperature difference $\Delta T_i$ is made smaller. With this, the extraordinary state of the combustion section 3 can be detected more correctly. The structure and operation of the temperature change determining units 23-1 to 23-n will be described later.

The warning signal AT-1 generated by the comparing and determining unit 22-1 and the warning signal ADT-1 generated by the temperature change determining unit 23-1 are supplied to the OR gate 24-1. The OR gate 24-1 calculates the logical summation of the warning signal AT-1 and the warning signal ADT-1 and generates the warning signal AL-1. The warning signal AL-1 is outputted when the blade path temperature $T_1$ itself or the temporal change of the blade path temperature $T_1$ is extraordinary.

In the same way, the warning signal AT-i generated by the comparing and determining unit 22-i of the comparing and determining units 22-1 to 22-n and the warning signal ADT-i generated by the temperature change determining unit 23-i of the temperature change determining units 23-1 to 23-n are supplied to the OR gate 24-i. The symbol i is an integer equal to or more than 1 and equal to or smaller than n.

In the same way, the OR gate 24-i of the OR gates 24-1 to 24-n calculates the logical summation of the warning signal AT-i and the warning signal ADT-i and generates the warning signal AL-i. The warning signal AL-i is outputted when the blade path temperature $T_i$ itself or the temporal change of the blade path temperature $T_i$ is extraordinary. The warning signals AL-1 to AL-n show whether or not the blade path temperatures $T_1$ to $T_n$ are in the extraordinary states, respectively.

Subsequently, the details of the structure of the temperature change determining units 23-1 to 23-n will be described. The temperature change determining units 23-1 to 23-n has the same structure except that the blade path temperatures are different. Therefore, the structures of the temperature change determining units will be described using the temperature change determining unit 23-1 as a typical example.

Figure 4:
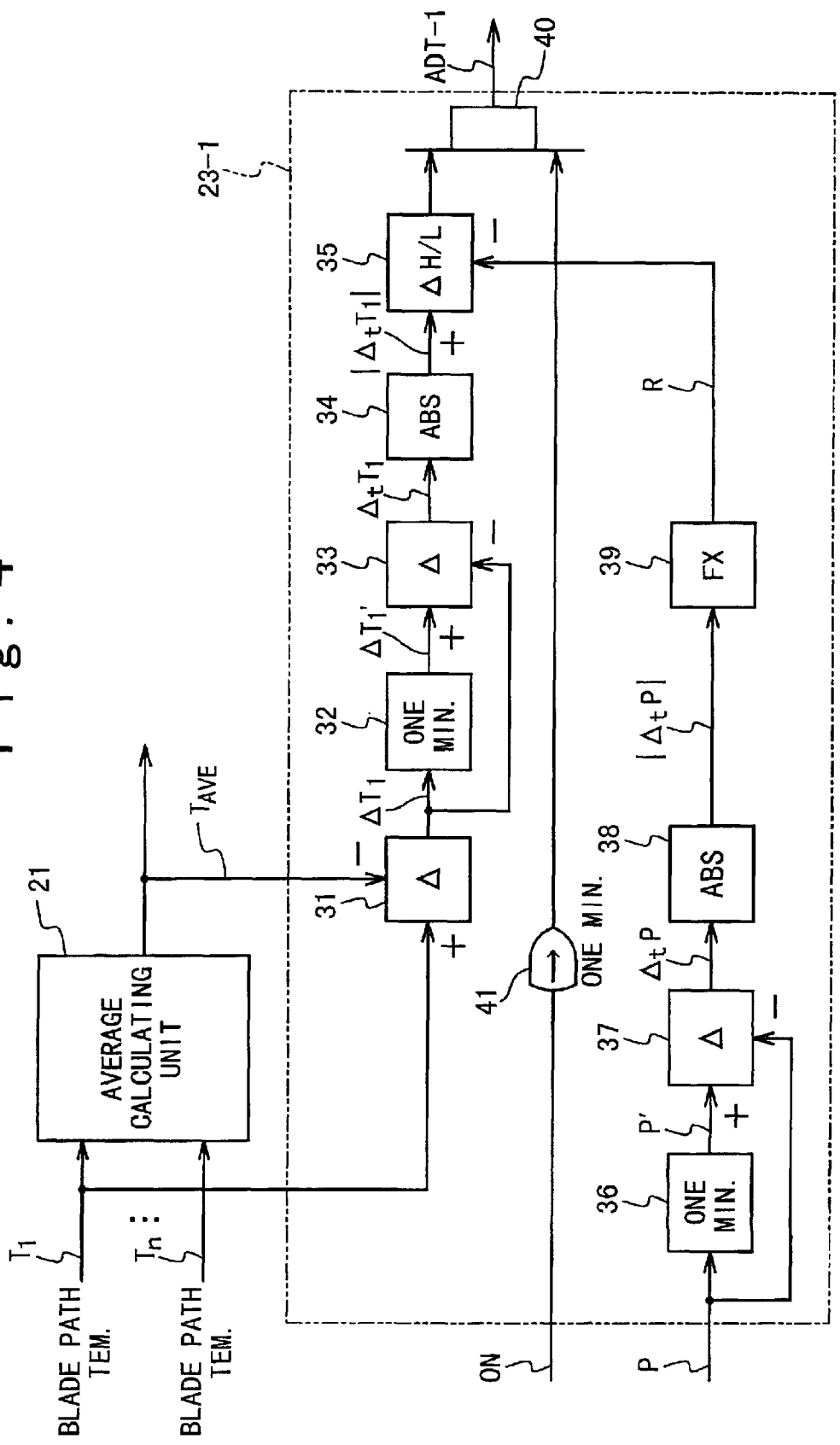
FIG. 4 is a diagram showing the structure of a temperature change determining unit of the monitoring unit in the gas turbine plant in the first embodiment.

FIG. 4 shows the structure of the temperature change determining unit 23-1. The temperature change determining unit 23-1 is comprised of a difference unit 31, a delay unit 32, a difference unit 33, an absolute value calculating unit 34, a determining unit 35, a delay unit 36, a difference unit 37, an absolute value calculating unit 38, a function unit 39, an AND gate 40, and a delay unit 41.

The difference unit 31 calculates the difference $\Delta T_1$ of the blade path temperature $T_1$ and the average temperature $T_{AVE}$. The delay unit 32 delays the temperature difference $\Delta T_1$ by one minute and outputs the delayed temperature difference $\Delta T_1$. The delayed temperature difference $\Delta T_1$ is hereinafter referred to as a temperature difference $\Delta T_1'$. The temperature difference $\Delta T_1'$ shows the difference before one minute between the blade path temperature $T_1$ and the average temperature $T_{AVE}$. The difference unit 33 calculates the difference $\Delta_t T_1$ of the temperature difference $\Delta T_1$ directly received from the difference unit 31 and the delayed temperature difference $\Delta T_1'$. The difference $\Delta_t T_1$ shows the temporal change of the temperature difference $\Delta T_1$ for one minute. The absolute value calculating unit 34 calculates the absolute value $|\Delta_t T_1|$ of the time difference $\Delta_t T_1$. The determining unit 35 determines whether or not the absolute value $|\Delta_t T_1|$ is larger than the tolerable level R. As mentioned above, the tolerable level R is set based on the temporal change of the output P of the gas turbine plant. The tolerable level R is set by the delay unit 36, the difference unit 37, the absolute value calculating unit 38 and the function unit 39.

The output P of the gas turbine plant is supplied to the delay unit 36. The delay unit 36 delays the output P by one minute and outputs the delayed output P. The delayed output P is hereinafter referred to as an output P'. The output P' is the output of the gas turbine plant one minute before. The difference unit 37 calculates the temporal change $\Delta_t P$ of the output P. The temporal change $\Delta_t P$ shows the temporal change of the output P of the gas turbine plant for one minute. The absolute value calculating unit 38 calculates the absolute value $|\Delta_t P|$ of the temporal change $\Delta_t P$. The function unit 39 calculates the above-mentioned tolerable level R based on the absolute value $|\Delta_t P|$.

Figure 5:
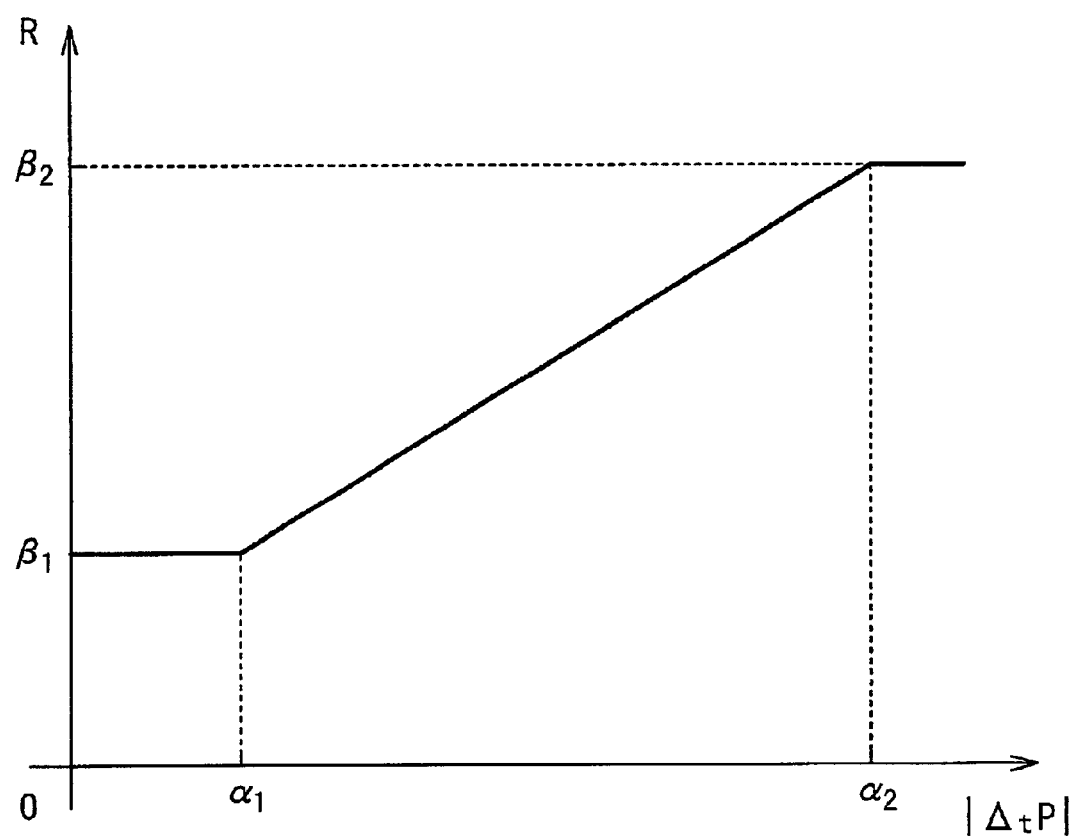
FIG. 5 is a graph showing dependence of a tolerable level R to an absolute value of a temporal change of the output P of the gas turbine plant in the first embodiment.

FIG. 5 shows the dependence of the tolerable level R on the absolute value $|\Delta_t P|$ calculated by the function unit 39. An example of the setting is shown below. The tolerable level R increases sense in accordance with the absolute value $|\Delta_t P|$ monotonously in a wide. In detail, the tolerable level R takes a constant of $\beta_1$ in case of $0 \leq |\Delta_t P| \leq \alpha_1$. Also, in case of $\alpha_1 \leq |\Delta_t P| \leq \alpha_2$, the tolerable level R increases from $\beta_1$ to $\beta_2$ in accordance with the increase of $|\Delta_t P|$ linearly. Also, in case of $|\Delta_t P| \geq \alpha_2$, the tolerable level R takes a constant value of $\beta_2$. That is, when the temporal change of the output P of the gas turbine plant is large, the tolerable level R becomes large, and when the temporal change of the output P of the gas turbine plant is small, the tolerable level R becomes small. However, the minimum of the tolerable level R is $\beta_1$ and the upper limit of the tolerable level R is $\beta_2$.

The output of the determining unit 35 becomes an ON state when the absolute value $|\Delta_t T_1|$ is equal to or more than the tolerable level R, and becomes an OFF state when the absolute value $|\Delta_t T_1|$ is smaller than the tolerable level R. The output of the determining unit 35 is connected with the first input terminal of the AND gate 40.

A parallel signal ON is supplied to the delay unit 41 to show whether or not the gas turbine plant is in the operation state. The parallel signal ON is set to the ON state when the gas turbine plant is in the operation state. The output terminal of the delay unit 41 is connected with the second input terminal of the AND gate 40. The delay unit 41 delays the parallel signal ON by one minute, and outputs the delayed parallel signal ON.

The AND gate 40 calculates a logical product of the output of the determining unit 35 and the output of the delay unit 41, and outputs the above-mentioned warning signal ADT-1. The warning signal ADT-1 is set to the ON state when the gas turbine plant is in the operation state, and the absolute value $|\Delta_t T_1|$ is equal to or higher than the tolerable level R. The extraordinary state of the temporal change of the blade path temperature $T_1$ is warned by the warning signal ADT-1.

As mentioned above, the temperature change determining units 23-1 to 23-$n$ have the same structure except that the blade path temperatures are different, and the explanation is not carried out.

In the first embodiment, the extraordinary state of the blade path temperature detects $T_i$ based on the temporal change $|\Delta_t T_i|$ of the temperature difference $\Delta T_i$ of the blade path temperature $T_i$ and the average temperature $T_{AVE}$. Thus, even if the change of the blade path temperature $T_i$ is detected when the combustion section 3 is not in an extraordinary state, it is not determined as the extraordinary state of the combustion section 3. In this way, the detection sensitivity of the extraordinary state of the combustion section 3 can be made high.

Moreover, in the blade path temperature monitoring unit in the first embodiment, the tolerable level R to the temporal changes $|\Delta_t T_1|$ to $|\Delta_t T_n|$ of the temperature differences $\Delta T_1$ to $\Delta T_n$ is adjusted based on the temporal change of the output P of the gas turbine plant. With this, even if the change of the blade path temperature $T_i$ is caused because of the occurrence of swirler phenomenon accompanying the operation of the gas turbine plant when the combustion section 3 is not in the extraordinary state, the detection sensitivity of the extraordinary state of the combustion section 3 can be made higher.

It should be noted that in the first embodiment, the tolerable level R to the temporal changes $|\Delta_t T_1|$ to $|\Delta_t T_n|$ of the differences $\Delta T_1$ to $\Delta T_n$ is set based on the output P of the gas turbine plant. However, the tolerable level R may be set based on other physical quantities having one-to-one correspondence to the output P of the gas turbine plant. For example, as the output P of the gas turbine plant increases, the average temperature $T_{AVE}$ of the above-mentioned blade path temperatures $T_1$ to $T_n$ becomes higher, and has one-to-one correspondence to the output P of the gas turbine plant. Therefore, an average $T_{AVE}$ can be used, instead of the output P of the gas turbine plant.

Also, as the output P of the gas turbine plant increases, the temperature of the gas 11 exhausted from the turbine section 2 becomes higher and one-to-one correspondence to the output P of the gas turbine plant. Therefore, the temperature of discharge gas 11 may be used, instead of the output P of the gas turbine plant.

Also, the output P of the gas turbine plant becomes large as the flow rate of the fuel 6 supplied to the combustion section 3 increases. Therefore, the flow rate of the fuel 6 has one-to-one correspondence to the output P of the gas turbine plant. Thus, the flow rate of the fuel 6 supplied to the combustion section 3 can be used instead of the output P of the gas turbine plant.

Moreover, the output P of the gas turbine plant becomes larger as the opening degree of the fuel supply valve 7 for supplying the fuel 6 to the combustion section 3 becomes larger. Therefore, the opening degree of the fuel supply valve 7 has one-to-one correspondence to the output P of the gas turbine plant. Thus, the opening degree of the fuel supply valve 7 can be used instead of the output P of the gas turbine plant.

The gas turbine plant in the second embodiment has the almost same structure as the gas turbine plant in the first embodiment. In the gas turbine plant in the second embodiment, a monitoring unit 15' is used in place of the monitoring unit 15 of the gas turbine plant in the first embodiment. The other parts of the gas turbine plant in the second embodiment has same as those in the first embodiment and carries out the same operations.

Figure 6:
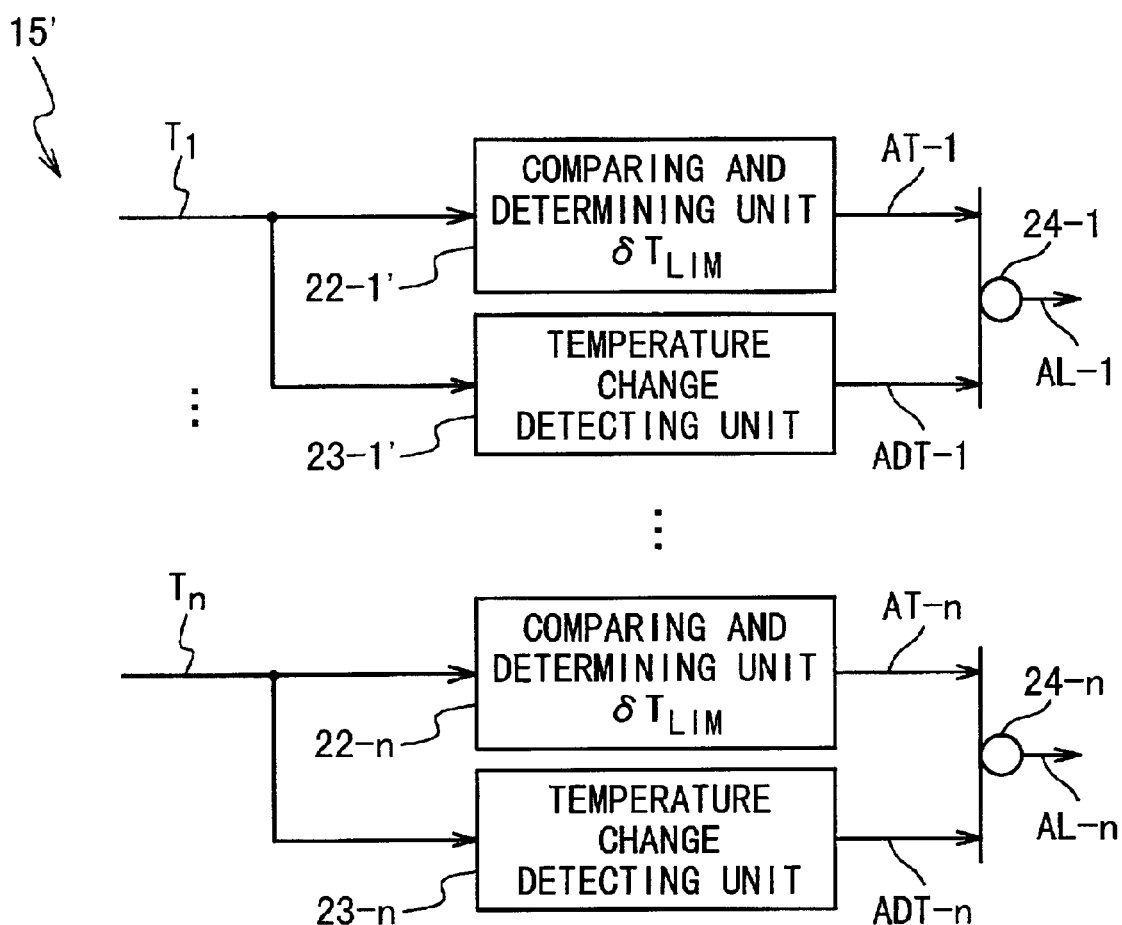
FIG. 6 is a block diagram showing the structure of the monitoring unit used in the gas turbine plant in a second embodiment.

FIG. 6 shows the structure of the monitoring unit 15' of the gas turbine plant in the second embodiment. Referring to FIG. 6, the monitoring unit 15' is different from the monitoring unit 15 of the gas turbine plant in the first embodiment in the point that the monitoring unit 15' does not calculate the average $T_{AVE}$ of the blade path temperatures $T_1$ to $T_n$. As shown in FIG. 6, the monitoring unit 15' is comprised of comparing and determining units 22-1' to 22-n', temperature change determining units 23-1' to 22-n' and OR gates 24-1 to 24-n.

The comparing and determining unit 22-1' outputs the warning signal AT-1 when the difference $\delta T_1$ of the blade path temperature $T_1$ and a predetermined reference value is equal to or larger than a predetermined temperature difference $\delta T_{LIM}$. The comparing and determining unit 22-1' does not output the warning signal AT-1 when the difference $\delta T_1$ is smaller than the temperature difference $\delta T_{LIM}$.

The comparing and determining units 22-2' to 22-n' operate in the same way as the comparing and determining unit 22-1 except that the blade path temperatures inputted thereto are different. That is, the comparing and determining unit 22-i' (i is an integer equal to or more than 1 or equal to or less than n) of the comparing and determining units 22-1 to 22-n. When the difference $\delta T_i$ of the blade path temperature $T_i$ and the predetermined reference value is equal to or larger than the predetermined temperature difference $\delta T_{LIM}$, the comparing and determining unit 22-i' outputs the warning signal AT-i. Also, the comparing and determining unit 22-i' does not output the warning signal AT-i when the difference $\delta T_i$ is smaller than the temperature difference $\delta T_{LIM}$.

The temperature change determining unit 23-1' determines whether or not the temporal change of the blade path temperature $T_1$ is extraordinary. It should be noted that in the first embodiment, the extraordinary state is detected based on the temporal change of the difference $\Delta T_1$ of the average temperature $T_{AVE}$ and the blade path temperature $T_1$ in the temperature change determining unit 23-1 of the monitoring unit 15. In the second embodiment, the temperature change determining unit 23-1' outputs the warning signal ADT-1, when determining that the temporal change of the blade path temperature $T_1$ is extraordinary. The temperature change determining unit 23-1' does not output the warning signal ADT-1, when determining that the temporal change of the blade path temperature $T_1$ is not extraordinary.

The temperature change determining units 23-2' to 23-n' operate in the same ways as the temperature change determining unit 23-1' except that the blade path temperatures supplied thereto are different. That is, the temperature change determining unit 23-i' (i is an integer equal to or more than 1 and equal to or less than n) of the temperature change determining units 23-1 to 23-n determines whether or not the temporal change of the blade path temperature $T_i$ is extraordinary. The temperature change determining unit 23-i outputs the warning signal ADT-i, when determining that the temporal change of the blade path temperature $T_i$ is extraordinary. The temperature change determining unit 23-i does not output the warning signal ADT-i, when determining that the temporal change of the blade path temperature $T_i$ is not extraordinary. At this time, the tolerable level R to the temporal change of the blade path temperature $T_i$ is changed in accordance with the temporal change of the output P of the gas turbine plant. The reason is as described in the first embodiment.

The OR gate 24-1 calculates the logical summation of the warning signal AT-1 and the warning signal ADT-1 and generates the warning signal AL-1. The warning signal AL-1 is outputted when the temporal change of the blade path temperature $T_1$ itself or the blade path temperature $T_1$ is extraordinary.

In the same way, the OR gate 24-i of the OR gates 24-1 to 24-n calculates the logical summation of the warning signal AT-i and the warning signal ADT-i and generates the warning signal AL-i. The warning signal AL-i is outputted when the blade path temperature $T_i$ itself or the temporal change of the blade path temperature $T_i$ is extraordinary. The warning signals AL-1 to AL-n show whether or not the blade path temperatures $T_1$ to $T_n$ are extraordinary, respectively.

Figure 7:
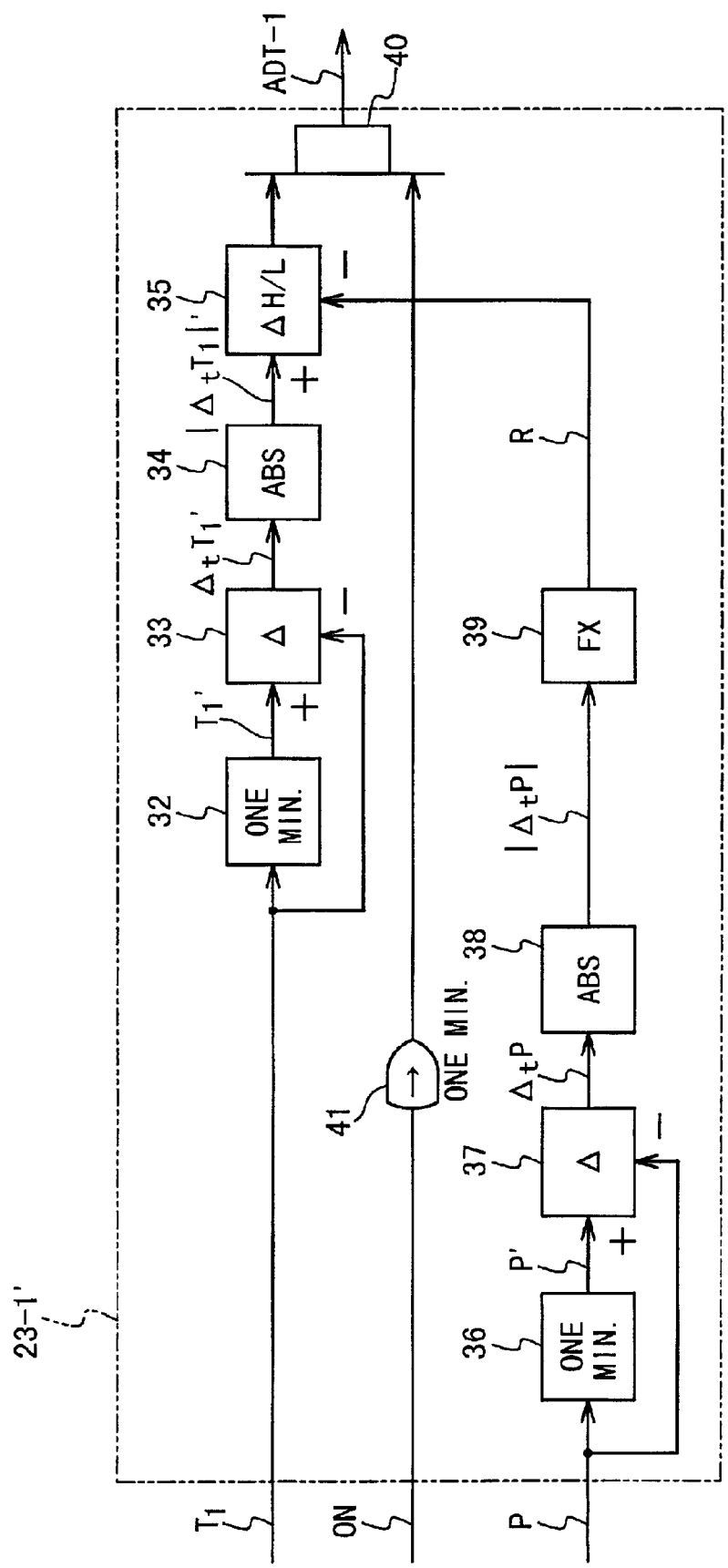
FIG. 7 is a block diagram showing the structure of a temperature change determining unit of the monitoring unit in the gas turbine plant in the second embodiment.

FIG. 7 shows the structure of the temperature change determining unit 23-1'. The temperature change determining unit 23-1' has the structure that the difference unit 31 of the temperature change determining unit 23-1 in the first embodiment is removed and the blade path temperature $T_1$ is directly supplied to the delay unit 32 and the difference unit 33. The temperature change determining unit 23-1' is comprised of a delay unit 32, a difference unit 33, an absolute value calculating unit 34, a determining unit 35, a delay unit 36, a difference unit 37, an absolute value calculating unit 38, a function unit 39, an AND gate 40 and a delay unit 41.

The delay unit 32 delays the blade path temperature $T_1$ by one minute and outputs the delayed blade path temperature $T_1$. The delayed blade path temperature $T_1$ is hereinafter referred to as a delayed blade path temperature $T_1'$. The difference unit 33 calculates the difference $\Delta_t T_1'$ of the blade path temperature $T_1$ directly received and the delayed blade path temperature $T_1'$. The difference $\Delta_t T_1'$ shows the temporal change the blade path temperature $T_1$ for one minute. The absolute value calculating unit 34 calculates the absolute value $|\Delta_t T_1'|$ of the difference $\Delta_t T_1'$. The determining unit 35 determines whether or not the absolute value $|\Delta_t T_1'|$ is extraordinary, i.e., is equal to or larger than the tolerable level R. The tolerable level R is set based on the temporal change of the output P of the gas turbine plant. The tolerable level R is set by the delay unit 36, the difference unit 37, the absolute value calculating unit 38 and the function unit 39.

The output P of the gas turbine plant is supplied to the delay unit 36. The delay unit 36 outputs the delayed output P by one minute. The delayed output P is hereinafter referred to as a delayed output P'. The output P' is the output of the gas turbine plant one minute before. The difference unit 37 calculates the difference $\Delta_t P$ of the output P and the output P'. The difference $\Delta_t P$ shows the change of the output P of the gas turbine plant for one minute. The absolute value calculating unit 38 calculates the absolute value $|\Delta_t P|$ of the difference $\Delta_t P$. The function unit 39 calculates the above-mentioned tolerable level R based on the absolute value $|\Delta_t P|$.

An example in which the function unit 39 calculates the tolerable level R based on the absolute value $|\Delta_t P|$ is as described with reference to FIG. 5 in the first embodiment. When the change of the output P of the gas turbine plant is large, the tolerable level R becomes large, and when the change of the output P of the gas turbine plant is small, the tolerable level R becomes small. However, the minimum of the tolerable level R is $\beta_1$ and the upper limit of the tolerable level R is $\beta_2$.

The output of the determining unit 35 is set to the ON state when the absolute value $|\Delta_t T_1'|$ is equal to or larger than the tolerable level R, i.e., when the combustion section 3 is in an extraordinary state. Also, the output of the determining unit 35 is set to the OFF state, when the absolute value $|\Delta_t T_1'|$ is smaller than the tolerable level R, i.e., when the combustion section 3 is not in an extraordinary state. The output of determining unit 35 is connected with the first input terminal of the AND gate 40.

The output terminal of the delay unit 41 is connected with the second input terminal of the AND gate 40. The parallel signal ON shows whether or not the gas turbine plant is in the operation state and is supplied to the delay unit 41. The parallel signal ON is set to the ON state when the gas turbine plant is in the operation state. The delay unit 41 delayed the parallel signal ON by one minute and outputs the delayed parallel signal ON.

The AND gate 40 calculates the logical product of the output of the determining unit 35 and the output of the delay unit 41 and outputs the above-mentioned warning signal ADT-1. The warning signal ADT-1 is set to the ON state when the gas turbine plant is in the operation state and the absolute value $|\Delta_t T_1|'$ is equal to or lager than the tolerable level R. The warning signal ADT-1 warns the extraordinary state of the temporal change of the blade path temperature $T_1$.

The temperature change determining units 23-2' to 23-n' have the same structure as the temperature change determining unit 23-1' except that the blade path temperatures inputted thereto are different, and the explanation is not carried out.

The gas turbine plant in the second embodiment detects the extraordinary state of the blade path temperature $T_i$ based on the temporal change $|\Delta_t T_i|'$ of the blade path temperature $T_i$. Even if the temporal change of the blade path temperature $T_i$ is caused when the combustion section 3 is not in an extraordinary state, the detection sensitivity of the extraordinary state of the combustion section 3 can be made high.

Moreover, in the blade path temperature monitor in this embodiment, the tolerable level R to the temporal change $|\Delta_t T_i|'$ of the blade path temperature $T_i$ is adjusted based on the temporal change of the output P of the gas turbine plant. Even if the change of the blade path temperature $T_i$ is caused due to the occurrence of swirler phenomenon accompanying the operation of the gas turbine plant when the combustion section 3 is not in an extraordinary state, the detection sensitivity of the extraordinary state of the combustion section 3 can be made higher.

It should be noted that in the second embodiment, like the first embodiment, the tolerable level R can be set based on other physical quantities having one-to-one correspondence to the output P of the gas turbine plant. As the other physical quantities, the flow rate of the fuel 6, the temperature of the exhausted gas 11, the opening degree of the fuel supply valve 7 can be used.

According to the present invention, there can be provided with the gas turbine plant in which the blade path temperature is monitored and measured and the extraordinary state of the combustion section is detected. Also, the gas turbine plant has the high sensitivity of the detection of the extraordinary occurrence even if the change of the blade path temperature is caused when there is no extraordinary state.

What is claimed is:

1. A gas turbine plant comprising:

a combustion section configured to combust fuel and air to generate combustion gas;

a turbine section configured to be driven by the combustion gas from the combustion section;

an exhaust section connected to the turbine section and configured to exhaust the combustion gas from the turbine section;

a plurality of temperature detecting units provided in the exhaust section configured to measure a plurality of temperatures of the combustion gas; and a monitoring unit configured to generate a warning signal based on a comparison of a predetermined level and a temporal change of data corresponding to at least one of the plurality of temperatures, the monitoring unit comprising:

an averaging circuit configured to calculate an average temperature of the plurality of temperatures; and a plurality of temperature change determining sections, wherein said temperature change determining sections comprise:

a first difference calculating unit configured to calculate a temperature difference between said average temperature and the at least one of the plurality of temperatures;

a delay unit configured to delay said temperature difference by a predetermined time period to provide a delayed temperature difference; and a second difference calculating unit configured to calculate a calculated difference between said delayed temperature difference and said temperature difference and to output the calculated difference as said temporal change of data corresponding to the at least one of the plurality of temperatures.

2. The gas turbine plant according to claim 1, wherein said predetermined level is determined based on an output of said gas turbine plant.

* * * * *